United States Patent
Liu et al.

(10) Patent No.: US 7,788,223 B2
(45) Date of Patent: Aug. 31, 2010

(54) RESOURCE FRESHNESS AND REPLICATION

(75) Inventors: Huisheng Liu, Sammamish, WA (US); Guhan Suriyanarayanan, Redmond, WA (US); Nikolaj S. Bjørner, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 304 days.

(21) Appl. No.: 11/364,234

(22) Filed: Feb. 28, 2006

(65) Prior Publication Data
US 2007/0168516 A1 Jul. 19, 2007

Related U.S. Application Data

(60) Provisional application No. 60/742,508, filed on Dec. 5, 2005.

(51) Int. Cl.
G06F 7/00 (2006.01)
G06F 17/00 (2006.01)
G06F 15/16 (2006.01)

(52) U.S. Cl. .................. 707/618; 707/638; 707/689; 709/248

(58) Field of Classification Search .......... 707/201, 707/999.201, 609, 610, 611, 612, 618, 638, 707/689; 709/248
See application file for complete search history.

(56) References Cited

U.S. PATENT DOCUMENTS

| | | | |
|---|---|---|---|
| 5,486,826 A | | 1/1996 | Remillard |
| 5,765,171 A | | 6/1998 | Gehani et al. |
| 5,812,773 A | * | 9/1998 | Norin .......... 709/204 |
| 6,401,104 B1 | * | 6/2002 | LaRue et al. ........ 707/203 |
| 6,412,017 B1 | | 6/2002 | Straube |
| 6,463,501 B1 | | 10/2002 | Kern et al. |
| 6,938,048 B1 | | 8/2005 | Jilk et al. |
| 7,035,847 B2 | | 4/2006 | Brown |
| 2003/0187947 A1 | | 10/2003 | Lubbers |
| 2004/0068523 A1 | | 4/2004 | Keith |
| 2004/0111390 A1 | | 6/2004 | Saito |

(Continued)

FOREIGN PATENT DOCUMENTS

EP 0 661 652 5/1995

(Continued)

OTHER PUBLICATIONS

Microsoft, "Determining Lease Duration", Mar. 28, 2003 available online: http://207.46.196.114/windowsserver/en/library/cd40401b-eae9-43a8-9da0-09aff0a71dee1033.mspx?pf=true.*

(Continued)

*Primary Examiner*—Mohammad Ali
*Assistant Examiner*—Brannon W Smith
(74) *Attorney, Agent, or Firm*—Merchant & Gould P.C.

(57) ABSTRACT

Aspects of the subject matter described herein relate to resource replication systems. In aspects, a mechanism is described that detects when local resources are stale. Local resources may be stale when the time between a last successful synchronization activity and a current time exceeds a staleness value. If the local resources are determined to be stale, the local member may refrain from certain synchronization activities until the local member is allowed to resume these certain synchronization activities. If the local resources are not stale, additional synchronization activities including synchronizing resources between the member and an upstream or downstream partner may be performed.

14 Claims, 6 Drawing Sheets

U.S. PATENT DOCUMENTS

| | | | |
|---|---|---|---|
| 2004/0177100 | A1 | 9/2004 | Bjorner |
| 2004/0186916 | A1 | 9/2004 | Bjorner |
| 2004/0230615 | A1 | 11/2004 | Blanco |
| 2004/0255048 | A1* | 12/2004 | Lev Ran et al. ............ 709/249 |
| 2004/0267838 | A1 | 12/2004 | Curran et al. |
| 2005/0015413 | A1 | 1/2005 | Teodosiu et al. |
| 2005/0050067 | A1* | 3/2005 | Sollicito et al. ............ 707/100 |
| 2005/0099963 | A1 | 5/2005 | Multer |
| 2005/0125621 | A1 | 6/2005 | Shah |
| 2005/0256907 | A1 | 11/2005 | Novik |
| 2006/0031188 | A1 | 2/2006 | Lara |
| 2006/0085561 | A1 | 4/2006 | Manasse |
| 2007/0043766 | A1* | 2/2007 | Nicholas et al. .......... 707/104.1 |
| 2007/0106771 | A1* | 5/2007 | Lucash et al. .............. 709/223 |
| 2007/0180075 | A1* | 8/2007 | Chasman et al. ........... 709/223 |

FOREIGN PATENT DOCUMENTS

| | | | |
|---|---|---|---|
| EP | 1387296 A1 * | 2/2004 | |
| WO | WO 99/66408 | 12/1999 | |
| WO | WO 2005/024552 | 3/2005 | |

OTHER PUBLICATIONS

Barbara Liskov, "Practical uses of synchronized clocks in distribued systems", Jan. 1993, Distributed Computing.*
Sanjay Ghemawat et al, "The Google File System", Oct. 19-22, 2003, SOSP '03.*
Haifeng Yu, "Consistent and Automatic Replica Regeneration", Dec. 2004, ACM Transactions on Storage, vol. 1, No. 1.*
Karin Petersen et al, "Bayou: Relicated Database Services for Worldwide Applications", 7$^{th}$ ACM SIGOPS European Workshop.*
Andrew D. Birrell et al, "The Echo Distributed File System", Sep. 10, 1993.*
Larson et al, "DNS on Windows 2000, 2nd Edition", 2001, O'Reilly and Associates.*
Yasushi Saito et al, "Optimistic Replication", Sep. 2003.*
International Search Report for PCT/US2006/04622.
"Overview of the Distributed File System Solution in Microsoft Windows Server 2003," Updated Date: Aug. 22, 2005, [15 pages].
Grönvall, Björn; Westerlund, Assar; Pink , Stephen; "The Design of a Multicast-based Distributed File," 1999, [26 pages].
Barreto , João; Ferreira, Paulo; "A Replicated File System for Resource Constrained Mobile Devices," 2004, [9 pages].
Welch, Terry A., "A Technique for High-Performance Data Compression," IEEE, Jun. 1984, pp. 8-19.
Birrell et al. The Echo Distributed File System. Internal Dec Report. Sep. 10, 1993.
Braam, P.J., The Coda Distributed File System, pp. 46 -51, Linux Journal, Jun. 1998.
Broder, Andrei Z.: On the Resemblance and Containment of Documents (Proceedings of Compression and Complexity of Sequences; 1997; http://citeseer.ist.psu.edu/broder97resembleance.html).
Burns & Long. Efficient Distributed Backup with Delta Compression, IOPADS 97.
Chien, S./Gratch J.: Producing Satisfactory Solutio0ns to Scheduling Problems: An Iterative Constrain Relaxation Approach (Jun. 1994; http://hdl.handle.net/2014/33806).
Davies Jr., C.T.: Data Processing Spheres of Control. IBM Systems Journal 17(2): 179-198 (1978).

Eshgih, Kave. Intrinsic References in Distributed Systems. 675-680. 22$^{nd}$ International Conference on Distributed Computing Systems, Workshops (ICDCSW '02) Jul. 2-5, 2002, Vienna, Proceedings.
Eshghi, Kave. Intrinsic References in Distributed Systems. Software Technology Laboratory, HP Laboratories Palo Alto, HPL-2002-32, Feb. 7$^{th}$ 2002, pp. 1-8.
Fisher, Doug: Iterative Optimization and Simplification of Hierarchical Clusterings (Journal of Artificial Intelligence Research 4; 147-179; http://www.cs.cmu.edu/afs/cs/project/jair/pub/volume4/fisher96a.pdf), (1996).
Guy, Popek et al, Rumor: Mobile Data Access Through Optimistic Peer-to-Peer Replication. (1998).
Hare, Van Court, Jr., Editor,*A Special Report on the SIGBDP Forum "The New Data Base Task Group Report"*, Atlantic City, NJ, May 17, 1971, vol. 3, No. 3, Special Issue, 1971.
IBMTransarc [Retrieved on Dec. 13, 2007], pp. 1-49, [Retrieved from internet: URL: http://www-01.ibm.com/common/ssi/rep_ca/0/897/ENUS297-220/index.html, (2007).
List of File System [online] http://en.wikipedia.org/wiki/List_of_file_systems, (2008).
Manber, Udi. Finding Similar Files in a Large File System. USENIX Winter 1994 Technical Conference, Oct. 1993, pp. 1-11.
Merrells, et al., LDAP Replication Architecture, IETF Draft Document, Mar. 2, 2000, pp. 1-95.
Merrells, John/Reed, Ed/Srinivasan, Uppili: LDAP Replication Architecture Draft (ETF draft; section 4.4; Aug. 1998; http://www.imc.org/ietf-Idup/mail-archive/msg00138.html); pp. 1-33.
Miyahsita, Kazuo: Improving System Performance in Case-Based Iterative Optimization through Knowledge Filtering (Proceeding of the International Joint Conference on Artificial Intelligence, http://citeseer.ist.osu.edu/37779.html), 6 pp., (2008).
NFS: Network File System Protocol Specification, [online] pp. 1-27, URL: http://tools, ietf.org/html/rfc1094, Sun MicroSystems, Inc., RFC 1094, Mar. 1989.
Petersen, Karin et al: Bayou: Replicated Database Services for World-wide Applications (Proceedings of the 7th SIGOPS European Workshop, Connemara, Ireland; Sep. 1996; http:/citeseer.ist.psu.edu/petersen96bayou.html), 6 pp.
Petersen, Karin et al.: Flexible Update Propogation for Weakly Consistend Replication (Proceedings of the 16th ACM Symposium on Operating System Principles (SOSP-16), Saint Malo France; 288-301; Oct. 1997; http://citeseer.ist.psu.edu/paterson97flexible.html.
Plan 9 Bell Labs [online] (http://en.wikipedia.org/wiki/Plan_9_from_Bell_Labs), (2008).
Popek J. et al. UCLA: Replication in Ficus Distributed File Systems. Proc. Workshop in Management of Replicated Data. Nov. 1990 pp. 20-25.
Puneot Kumar, M. Satyanaravanan, Flexible and Safe Resolution of File Conflicts (1995), USENIX.
Schmuck et al. (IBM): A Shared-Disk File System for Large Computing Clusters Proc Conference on File and Storage Technologies (FAST '02), Jan. 28-30, 2002, Monterey, CA, pp. 231-244.
Teodosiu, Dan et al: Optimizing File Replication over Limited-Bandwidth Networks using Remote Differential Compression (MSR-TR-2006-157 Nov. 1996; ftp://ftp.research.microsoft.com/pub/tr/TR-2006-157.pdf).
The Workings of the CODASYL, Database Task Group Report, ACM, New York 1971 (No Document).

* cited by examiner

RESOURCE FRESHNESS AND REPLICATION

CROSS REFERENCE TO RELATED APPLICATION

This application claims the benefit of U.S. Provisional Application No. 60/742,508, filed Dec. 5, 2005, entitled CONTENT FRESHNESS AND REPLICATION, which application is incorporated herein in its entirety.

BACKGROUND

Systems for replicating resources are becoming increasingly important to ensure availability and fault tolerance in large networks. Corporate networks that replicate files containing domain credentials and policies are one example where availability, scalability, consistency, and reliability are needed. Creating a flexible resource replication system that allows various replication behaviors, however, is challenging.

SUMMARY

Briefly, aspects of the subject matter described herein relate to resource replication systems. In aspects, a mechanism is described that detects when local resources are stale. Local resources may be stale when the time between a last successful synchronization activity and a current time exceeds a staleness value. If the local resources are determined to be stale, the local member may refrain from certain synchronization activities until the local member is allowed to resume these certain synchronization activities. If the local resources are not stale, additional synchronization activities including synchronizing resources between the member and an upstream or downstream partner may be performed.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

The aspects described above and other aspects will become apparent from the following Detailed Description when taken in conjunction with the drawings, in which:

DETAILED DESCRIPTION

Exemplary Operating Environment

Figure 1:
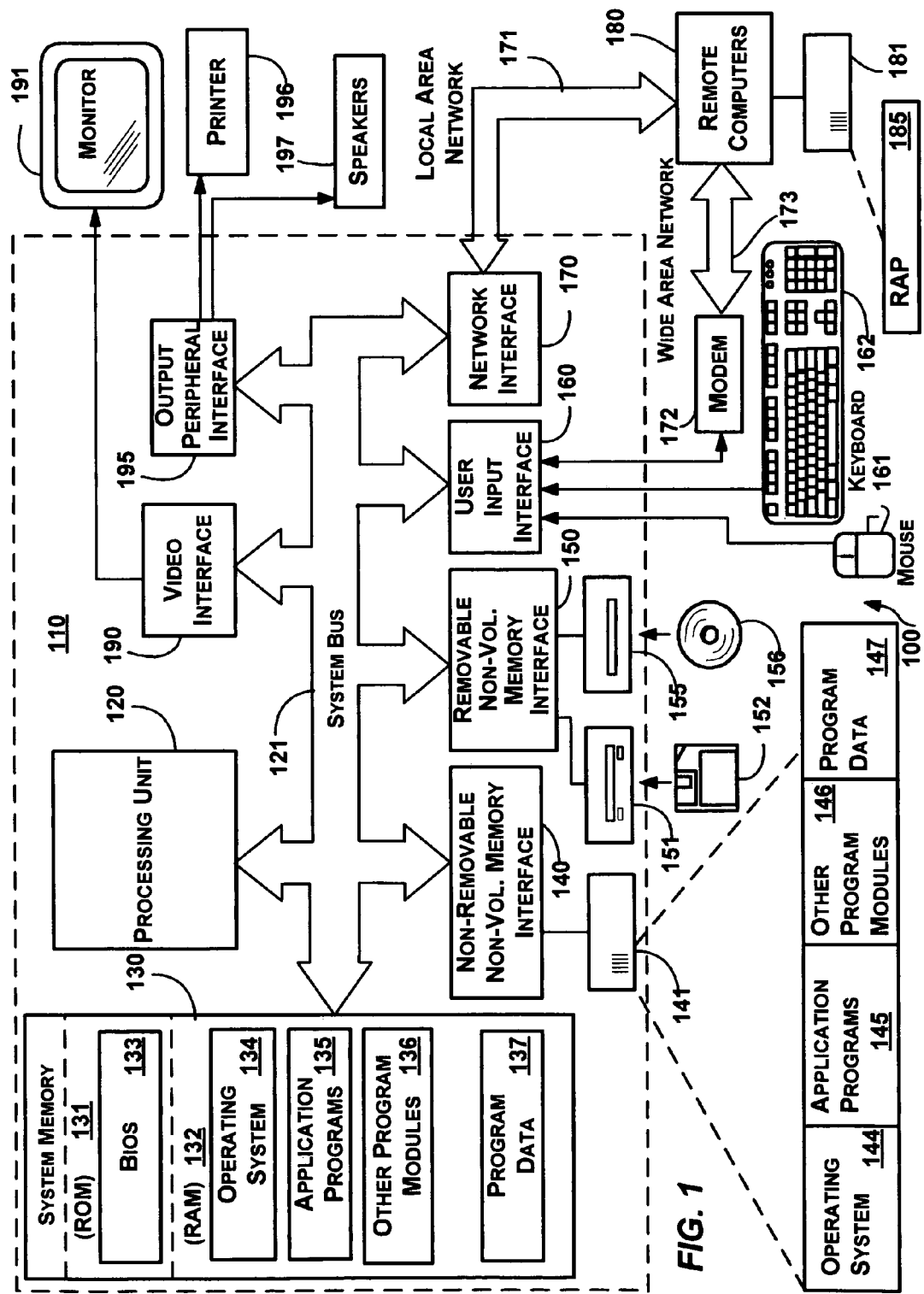
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Resource Replication

As will readily be appreciated, modern machines may process thousands of resource changes in a relatively short period of time. Replicating these resources and keeping them synchronized across hundreds or thousands of machines connected via various networks of varying reliability and bandwidth poses a significant challenge.

Optimistic, multi-master replication systems allow unrestricted changes to replicated content on any machine participating in a given replica group. A replica group comprises a set of resources which are replicated on machines participating in the replica group. The set of resources of a replica group may span volumes. For example, a replica group may include resources associated with C: \DATA, D: \APPS, and E: \DOCS which may be replicated on a set of machines participating in the replica group. Potentially conflicting changes are reconciled under the control of the replication system using a set of conflict resolution criteria that defines, for every conflict situation, which conflicting change takes precedence over others.

A replica group member or member of a replica group comprises a machine that participates in the replica group by replicating resources contained thereon. A content set (sometimes referred to simply as "content") comprises the resources residing on a replica group member.

The term "machine" is not limited simply to a physical machine. Rather, a single physical machine may include multiple virtual machines. Replication from one machine to another machine, as used herein, implies replication of one or more members of the same replica group from one machine, virtual or physical, to another machine, virtual or physical. A single physical machine may include multiple members of the same replica group. Thus, replicating members of a replica group may involve synchronizing the members of a single physical machine that includes two or more members of the same replica group.

A resource may be thought of as an object. Each resource is associated with resource data and resource metadata. Resource data may include content and attributes associated with the content while resource metadata includes other attributes that may be relevant in negotiating synchronization and in conflict resolution. Resource data and metadata may be stored in a database or other suitable store; in an alternate embodiment, separate stores may be used for storing resource data and metadata.

In replication systems including data stores based on named files in a file system, resource data may include file contents, as well as any file attributes that are stored on the file system in association with the file contents. File attributes may include access control lists (ACLs), creation/modification times, and other data associated with a file. As used herein, a file may include directories (i.e., file system objects that may be associated with descendant files and directories and ancestor directories) and non-directories. Unless the context clearly indicates otherwise, the term file may be read as "resource data."

In replication systems including data stores not based on named files in a file system (e.g., ones in which resources are stored in a database or object-based data store), resource data appropriate to the data store is stored. Throughout this document, replication systems based on files in a file system are sometimes used for illustration, but it will be recognized that any data store capable of storing content may be used without departing from the spirit or scope of the subject matter described herein.

For each resource, resource metadata may include a globally unique identifier (GUID), whether the resource has been deleted, a version sequence number together with authorship of a change, a clock value to reflect the time a change occurred, and other fields, such as a digest that summarizes values of resource data and may include signatures for resource content. A digest may be used for a quick comparison to bypass data-transfer during replication synchronization, for example. If a resource on a destination machine is synchronized with content on a source machine (e.g., as indicated by a digest), network overhead may be minimized by transmitting just the resource metadata, without transmitting the resource data itself. Transmitting the resource metadata is done so that the destination machine may reflect the metadata included on the source machine in its subsequent replication activities. This may allow the destination machine, for example, to become a source machine in a subsequent replication activity. Resource metadata may be stored with or separate from resource data without departing from the spirit or scope of the subject matter described herein.

Version vectors may be used when replicating resources. A version vector may be viewed as a global set of counters or clocks of machines participating in a replica group. Each machine participating in the replica group maintains a version vector that represents the machine's current latest version and the latest versions that the machine has received with respect to other machines. Each time a resource is created, modified, or deleted from a machine, the resource's version may be set to a version number equivalent to the current version number for that machine plus one. The version vector for that machine is also updated to reflect that the version number for that machine has been incremented.

Version vectors maintain information about the state of knowledge. A version vector may map a machine identifier to a time stamp. Each machine participating in a replica group may maintain its own clock vector to record the clock values it knows that other machines have attained. The clock vectors may comprise version sequence numbers. In one embodiment, instead of maintaining a single clock value for each machine, a set of clock values may be maintained to accommodate processing updates out of order and to take advantage of basic set operations on version vectors.

In one embodiment, during synchronization, a version vector may be transmitted for use in synchronizing resources. For example, if machines A and B engage in a synchronization activity such as a join, machine B may transmit its version vector to A. Upon receiving B's version vector, A may then transmit changes for all resources, if any, that have versions not subsumed (i.e., not dominated) by B's version vector. The phrase "a version vector dominates another one" is a synonym for the corresponding inclusion relation between the version vectors.

Examples of use of version vectors in synchronization have been described in U.S. patent application Ser. No. 10/791,041 entitled "Interval Vector Based Knowledge Synchronization for Resource Versioning", U.S. patent application Ser. No. 10/779,030 entitled "Garbage Collection of Tombstones for Optimistic Replication Systems", and U.S. patent application Ser. No. 10/733,459 entitled, Granular Control Over the Authority of Replicated Information via Fencing and UnFencing".

Figure 2:
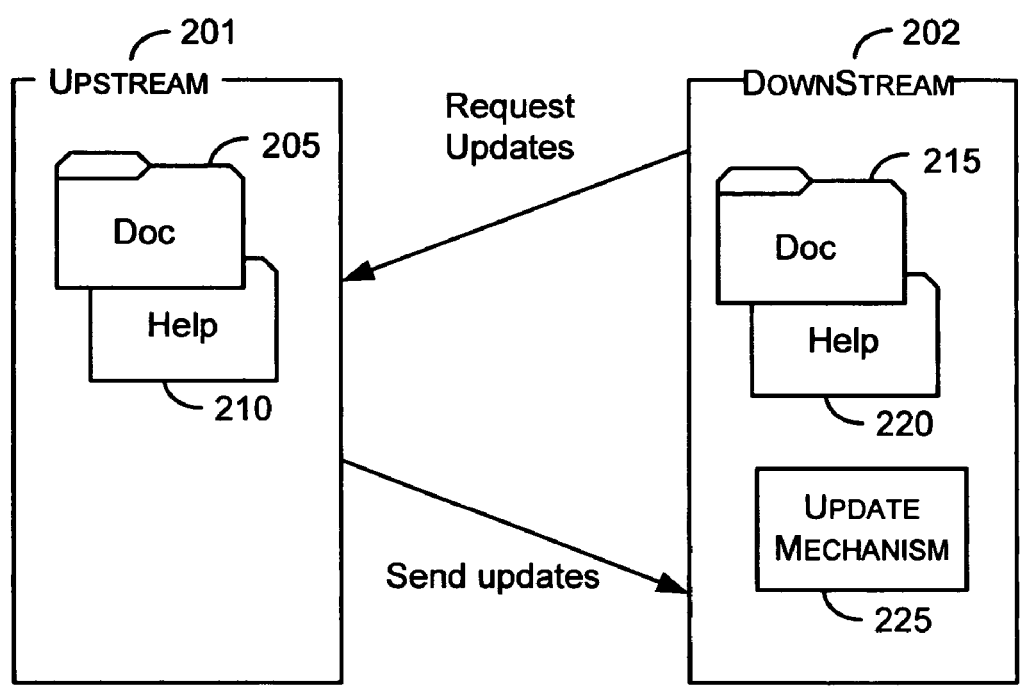
FIG. 2 is a block diagram that generally represents machines participating in a replica group in accordance with aspects of the subject matter described herein.

FIG. 2 is a block diagram that generally represents machines participating in a replica group in accordance with aspects of the subject matter described herein. As an example, an upstream machine 201 and a downstream machine 202 may participate in a replica group that includes two resources. These two resources may include, for example, documents directories 205 and 215 and help directories 210 and 220 (which are given different number on the two machines to indicate that at a particular moment in time, these resources may not include the same resource data—i.e., they may be out-of-sync).

Periodically, the downstream machine 202 may request updates from the upstream machine 201 and may update its resources based on the updates. Although only two machines are shown in FIG. 2, the upstream and downstream machines 201 and 202 may be part of a replication system that includes many other machines. A machine that is a source in one interaction (sometimes called an upstream machine) may later become a destination (sometimes called a downstream machine) in another interaction and vice versa.

The downstream machine 202 may include an update mechanism 225 that determines when to obtain updates from the upstream machine 201. If the downstream machine 202 is also an upstream partner of another machine (not shown), the update mechanism 225 may also determine which updates to send to the other machine. The update mechanism is described in more detail below in conjunction with FIG. 3.

Figure 3:
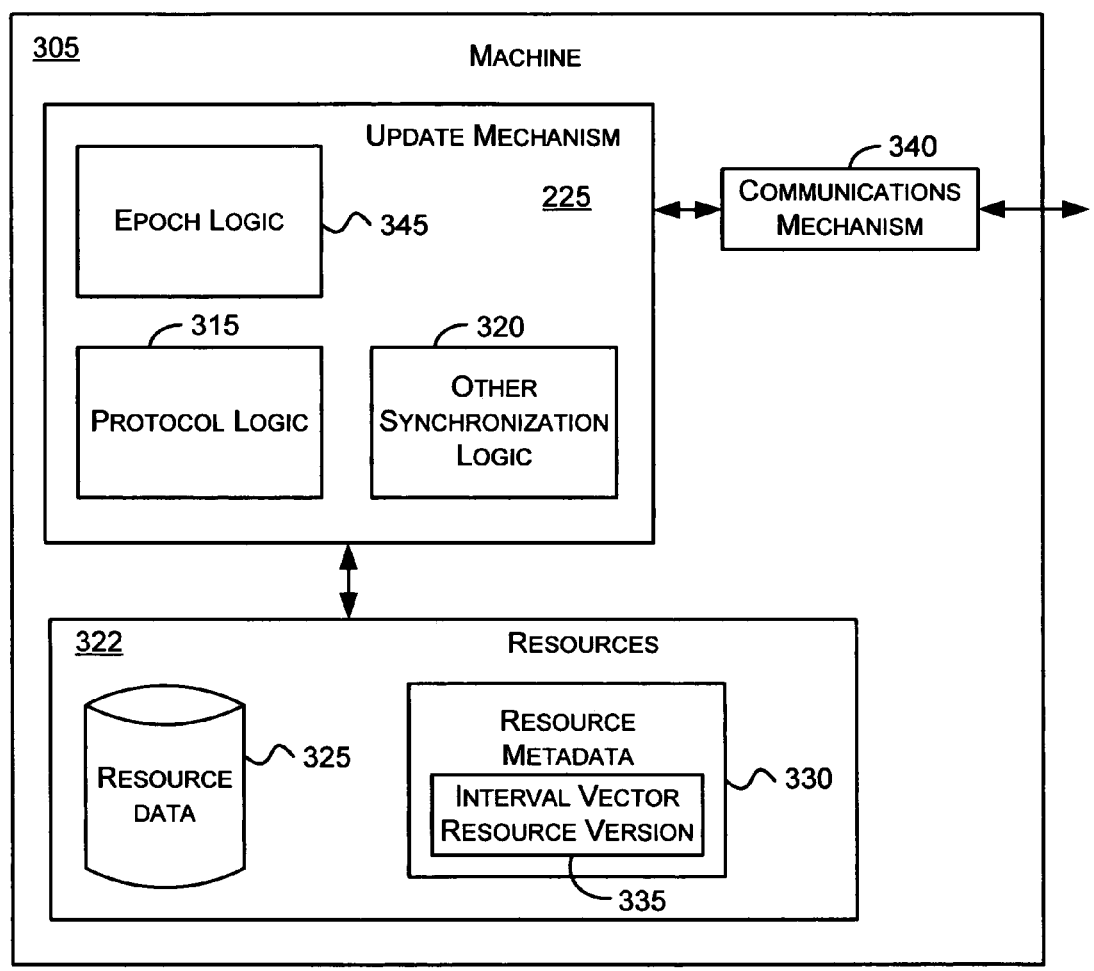
FIG. 3 is a block diagram representing a machine configured to operate in a resource replication system in accordance with aspects of the subject matter described herein.

FIG. 3 is a block diagram representing a machine configured to operate in a resource replication system in accordance with aspects of the subject matter described herein. The machine 305 includes an update mechanism 225, resources 322, and a communications mechanism 340. The update mechanism includes epoch logic 345, protocol logic 315, and other synchronization logic 320.

The resources 322 include the resource data store 325 for storing resource data and the resource metadata store 330. Although shown in the same box, the resource data store 325 may be stored together or in a separate store relative to the resource metadata store 330. Among other things, the resource metadata store 330 may include versions for each of the resource data records stored in the resource store 325 and may also include an interval vector (block 335).

The resource metdata store 330 may also include records associated with replicated folders, wherein each record indicates (e.g., via a timestamp) when its respective replicated folder was last involved in a successful synchronization activity with a corresponding replicated folder on another member. As used herein, a replicated folder is synonymous with a content set.

The communications mechanism 340 allows the update mechanism 225 to communicate with other update mechanisms (not shown) on other machines. The communications mechanism 340 may be a network interface or adapter 170, modem 172, or any other means for establishing communications as described in conjunction with FIG. 1.

The update mechanism 225 includes protocol logic 315 that operates to communicate with other replication partners and epoch logic 345 that operates to determine whether a machine may engage in synchronization activities with other machines as described in more detail below. The other synchronization logic 320 includes synchronization logic other than the protocol logic 315 (e.g., what to do in case of conflicting updates, how to determine which updates to obtain, and so forth). Although the protocol logic 315, epoch logic 345, and the other synchronization logic 320 are shown as separate boxes, in other embodiments, they may be combined in whole or in part.

As used herein, replication service may include any one or more of the components described above in conjunction with FIG. 3.

In operation, the machine 305 may operate as a downstream machine and/or an upstream machine. A downstream machine may establish a connection with an upstream machine for a replica group in which both the upstream and downstream machines participate. This may be done through the communications mechanism 340, for example. In establishing the connection, each of the partners (i.e., the upstream and downstream machines) may send its version vector to the other partner. Then, a session is established to send updates from the upstream machine to the downstream machine.

A session may be used to bind a replicated folder of an upstream machine with its corresponding replicated folder of a downstream machine. A session may be established for each replicated folder of a replica group. The sessions for multiple folders may be established over a single connection between the upstream and downstream machines.

After all updates from a session have been processed or abandoned, the downstream machine may close the session.

The downstream machine may request (e.g., via the communications mechanism 340) that the upstream machine notify the downstream machine when updates for any resources associated with the session occur. When the upstream machine notifies the downstream machine that updates are available, the downstream machine may request the version vector for the updates. In response the upstream machine sends its version vector (sometimes referred to as "VVup"). Note that VVup may include a complete version vector or a version vector that includes changes since the last version vector was sent. Notifying the downstream machine that updates are available and waiting for the downstream machine to request the updates may be performed in two steps so that a downstream machine is not accidentally flooded with version vectors from multiple upstream partners.

The downstream machine uses the upstream version vector it receives (i.e., "VVup") and computes a set-difference with its own version vector to compute versions residing on the upstream machine of which the downstream machine is unaware. The downstream machine may then request metadata regarding the versions. In requesting the updates, the downstream machine may include a delta version vector that indicates which updates the downstream machine needs.

A downstream machine may request for tombstones or live updates separately or together. A tombstone represents that a resource has been deleted and live updates represent updates that do not delete a resource. In some implementations, the downstream machine may request tombstones before it requests live updates. This may be done to improve efficiency as a resource that has been modified and then deleted does not need to be modified before it is deleted on a replication partner. In addition, processing a tombstone before a live update may clear a namespace of the data store (e.g., in a file system) of the downstream machine in preparation for processing a live replacement update.

After receiving the updates, the downstream machine may begin processing the updates to determine which resource data or portion thereof associated with the updates to request from the upstream machine. This processing, for example, may be performed through the other synchronization logic 340 which may be broken into multiple components (not shown). For example, an update may indicate that resource data of a particular resource or a portion thereof has been changed. In one embodiment, all the resource data associated with the resource may be requested by the downstream machine. In another embodiment, a portion of the resource data that includes the change may be requested by the downstream machine. As used herein, an interaction (e.g., request, response, update, and so forth) involving resource data should be understood to mean an interaction involving a portion or all of the resource data associated with a resource. For example, a request for resource data may mean a request for a portion or all of the resource data associated with a resource.

After determining resource data that needs to be requested, the downstream machine may request the resource data. In response, to a request for resource data, the upstream machine may send the resource data associated with a resource. Requests and responses may continue until all resource data which the downstream machine has determined needs to be updated has been requested. Note, that not all resource data may be sent as an upstream machine may no longer have a requested resource data if the resource has been deleted, for example. Another example in which resource data may not be sent is if the only effective change relative to the downstream machine is that the resource was renamed or that metadata attributes were updated. In such cases, receiving the update and renaming a local resource or updating local metadata may be all that is needed to synchronize the downstream resource with the upstream resource.

A session may be closed, for example, if a replicated folder is deleted, if a non-recoverable error occurs during replication, or if a replication system is shut down. Otherwise, the established session may be used for subsequent synchronization actions that involve all or a portion of the events above.

The update mechanism 225 may use a database (e.g., resource metadata store 330) to keep track of file and directory states of resource data in the resource data store 325. Each time a resource is updated, the resource may be assigned a new version in the database.

The update mechanism 225 may receive updates from an upstream partner and update local resources so that they are in sync with replicated resources on the upstream partner. Updates to the resource metadata may be stored in the resource metadata store 330 while updates to the resource data may be stored in resource data store 325. In one embodiment, the resource data store 325 and the resource metadata store 330 may be included on the same volume or physical device (e.g., hard drive).

The resource data may also be changed by local file activity related to the resource data. For example, a replicating partner may serve as a file server to many client machines (not shown). The client machines may access and modify resource data (e.g. files) on the replicating partner. The update mechanism 225 may include a resource data change monitor (not shown) that may monitor for changes to replicated resources (e.g., changes to files). When a replicated resource changes, the resource change monitor may update the resource metadata store 330 to indicate the update. This may serve to keep the resource metadata store 330 in sync with the resource data 325 and for synchronization between replica group members.

Content Freshness

The epoch logic 345 may be used when determining content freshness of a content set of a member of a replica group. When the member is disconnected from other machines having members of the replica group for an extended period of time, the member's resources may become out-of-sync and stale. If the member is rejoined to the replication group and does not use the epoch logic 345 described herein, the machine may start replicating with other members of the replication group. If there are no updates on the member, the member may receive updates from other members and may not replicate out any stale resources. If there are recent updates on the member that are not helpful, however, these updates may replicate out and overwrite good, update-to-date versions on other members. Thus, in one sense, content freshness may be viewed as a measure of the relevance of changes.

One example of where this may occur is when a machine is shut down for an extended period of time (e.g., a couple of months) due to a hardware issue. After the machine is repaired, the machine may go back online and members of replica groups hosted on the machine may begin synchronizing with partners on other machines. At or just prior to beginning synchronization with partners, some application (e.g. an antivirus application) may traverse one or more of the stale files and touch them (e.g., update their last-modified time). Without aspects described herein, this may cause stale files on the members to appear to be updated recently and replicate out to other members on other machines, overwriting better versions on the other machines.

In one embodiment, replicating stale content, of which the above example is typical, may be avoided or reduced through the use of epochs. In one embodiment, a machine may be designated as a master and an epoch value may be updated constantly on this machine and propagated out to other machines. During synchronization, if the epochs between two machines have a difference larger than what is tolerated, updates from the machine with stale content (e.g., the one with the smaller epoch) will not replicate back to the more update-to-date machine.

In aspects, epoch values may be set on a machine, replicated folders, or individual resources. If an epoch value is set on a machine, replicated folders and resources on the machine may be treated as having the same epoch value. If an epoch value is set on a replicated folder, all replicated resources associated with the folder may be treated as having the same epoch value. Another replicated folder on the machine may have a different epoch value. If each resource has its own epoch value, different resources in each replicated folder may have different epoch values.

Using epoch values may involve sending the epoch values during synchronization so that staleness can be determined. Consequently, implementing epoch values on a resource-by-resource basis may impose more overhead than implementing epoch values on replicated folders or on a machine-by-machine basis. Epoch values may be set in one way (e.g., by replicated folder) on one machine and in another way (e.g., by resource) on another machine without departing from the spirit or scope of the subject matter described herein.

In another embodiment, instead of using epoch values, a member may store a timestamp generated using a local system clock. The local system clock may be periodically updated from a time server to keep it up-to-date. The timestamp may also be updated depending on various synchronization activities. In one embodiment, the timestamp for a replicated folder may be updated each time the replicated folder successfully synchronizes with a replicated folder of another member. In another embodiment, the timestamp may be updated each time a good connection is established to another member of the replica group.

In yet another embodiment, the timestamp may be updated once a day or at some other selected frequency depending on synchronization activity. If a successful synchronization activity occurs during the period, the timestamp may be updated. A successful synchronization activity may involve successfully synchronizing a replicated folder with a replicated folder of another member, establishing a good connection with another member, maintaining a good connection with another member (e.g., as indicated by "heartbeat" messages or otherwise), obtaining a version vector from an upstream partner, sending a version vector to a downstream partner, or any other synchronization activity.

With timestamps, each replicated folder may have an associated record (e.g., CONTENT_SET_RECORD) in its metadata store. Among other fields included in the record, the record may include the timestamp, for example, to reflect the freshness of the record's corresponding replicated folder.

Note, that it is possible that one replicated folder hosted on a machine may be up-to-date while another replicated folder hosted on the machine may be stale. This may result because the one replicated folder has been able to synchronize with other members in its replica group while the other replicated folder has not been able to synchronize with other members in its replica group.

Before a member hosting a replicated folder tries to connect to or accept a connection request from another member, the member may check whether the timestamp of the replicated folder is up-to-date (e.g., within a settable number of days from the current time) before engaging in any other replication activity. If its timestamp is up-to-date, the member may connect to or allow the connection request and continue with synchronization activities. Otherwise, the member may not attempt to connect to another member or may refuse any connection request and refrain from starting any additional replication activity with the other member.

In another embodiment, if a member's content is stale, instead of refusing a connection request, the member may accept the connection request but refuse to engage in a synchronization session. In one embodiment, a refusal to engage in a synchronization session may occur in lieu of and at any time described herein related to refusing a connection request.

In another embodiment, a member with stale content may fail initialization so that thereafter the member will neither attempt to connect to other members nor be able to accept any connection request.

A member that refuses to accept a connection request may return a well known error code so that the other member knows that the member's content is stale. In addition, the member may log an event (e.g., EVENT_DFSR_CS_STALE).

A member of a replica group that has a timestamp that is old may be considered to have stale content. The maximum difference between the local system clock and the timestamp that may be tolerated before a replica member's content is considered stale may be set by a system administrator, user, or the like (hereinafter sometimes referred to as "system administrator"). This maximum difference is sometimes referred to as the "staleness value."

To avoid a false indication of staleness, the frequency at which the timestamp is updated in response to successful synchronization activities may be selected to occur at least once during a period of time corresponding to the staleness value. For example, if the member has maintained a good connection to another member, the timestamp may be updated each day during which the member maintained a good connection. If the staleness value is 30 days and the timestamp is updated daily, it will be unlikely that a false indication of staleness occurs.

Selecting an update frequency that does not guarantee at least one possibility for update during the time corresponding to the staleness value may lead to a false indication of staleness. For example, if the timestamp is only updated once every 30 days or longer and the staleness value is 30, it is possible that a successful synchronization activity (i.e., a good connection) may have occurred which was not updated in the timestamp.

It will be recognized that there is a tradeoff (e.g., overhead) between updating the timestamp very frequently as compared to the staleness value and updating the timestamp less frequently. In one embodiment, the frequency at which the timestamp is updated is once per day (if a successful synchronization activity occurred during the day) while the staleness value is set at 30 days. In other embodiments, other frequencies and staleness values may be selected depending on implementation and system configuration, for example.

In addition, by setting the staleness value equal to or less than the tombstone collection period, various problems may be avoided or reduced. The tombstone collection period is a period a member waits before deleting a metadata resource record that indicates that a resource has been deleted. Typically, a member waits to delete the record so that the tombstone may propagate to other members in the replica group. If a member is disconnected from other members of the replica group for a sufficient period of time, a tombstone for a resource may have been created and then the metadata resource record deleted. Without the mechanisms described herein, if the resource exists on the stale member (and if the synchronization described in conjunction with FIG. 3 occurs), the resource may be replicated out of the stale member and reintroduced to other members of the replica group.

To avoid or reduce this behavior, the staleness value may be set equal to or less than the tombstone period. The smaller the staleness value is compared to the tombstone period, the less likely it will be that a tombstone for a deleted resource will also be deleted before it has propagated to all non-stale members. As long as a member successfully synchronizes with another member within the tombstone period, the member will be more likely to receive the tombstone and mark the member's corresponding resource for deletion. If the member does not successfully synchronize with another member within this period, the content on the member may be marked as stale and other mechanisms described below may be taken to ensure that stale content is not reintroduced into other members of the replica group.

When a replicated folder becomes stale, a system administrator may disable and then re-enable it to cause the replicated folder to synchronize with another member when an inbound connection is available. Re-enabling the replicated folder may cause the replicated folder to go through an initial synchronization. During this initial synchronization, at least one of three replication strategies may be used to synchronize replicated folders as described below.

In one strategy, one of the replication partners (e.g., the partner with stale content) may be set as read-only (or a slave). In short, any update on the read-only member is discarded. If a file is created on the member, it is deleted. If an existing file is deleted, it is re-animated (e.g., undeleted). If a file is updated, the update is discarded, and the original version, or a newer version from another partner is re-installed. Generally, this causes all updates from the non read-only partner (e.g., master) to be replicated to the read-only partner.

In a second strategy, merging of resources occurs. In merging, resources from an upstream partner replicate to the stale partner for all resources which are different on the stale partner. If the stale partner does not include a resource, that resource is replicated to the stale partner. If the stale partner includes a resource that the upstream partner does not, this resource is not deleted on the stale partner and may replicate out from the stale partner if the stale partner is an upstream partner of another member.

In a third strategy, synchronization as described above in conjunction with FIG. 3 may occur. In this strategy, generally, resources with more recent modification dates replicate out and overwrite corresponding resources on other members with less recent modification dates.

It is possible that all of the members of a replica group may be stale. In such a case, one of the replica members may be set as the primary member. If a member is designated as a primary member, the member may replicate out resources to its downstream partners. If a member is not designated as a primary member, the member may not replicate out resources to its downstream partners until it has successfully synchronized resources with an upstream partner. After a member has successfully replicated with another member, the member may resume standard replication activities as described in conjunction with FIG. 3.

Fence values may be set which control which resources win (and are replicated out) during synchronization. Fence values allow a system administrator to indicate resources of a member which replicate out to other members of a replica group regardless of other characteristics of the resources. For example, a resource that has been assigned a higher fence value may replicate out even if it is older than a corresponding resource on another member.

In one embodiment, automatic recovery is performed when all members of a replica group are stale. The primary member may have been pre-designated by a system administrator to become a primary member in the case of all members becoming stale. Alternatively, other characteristics of the members may be used (e.g., location, hierarchical order if any, latest timestamp, and so forth) to determine which machine is designated as the primary machine.

In another embodiment, manual intervention may be performed when all of the members of a replica group are stale. In such intervention, a system administrator may be informed that all of the members are stale and that one needs to be set as primary for synchronization to resume. The system administrator may then indicate which member is the primary member.

If a replica group member has authoritative resources or only outbound connections (i.e., the member has no upstream partners), the member may also be considered stale if it is disconnected from other members for an extended period of time. Authoritative resources are resources designated to override corresponding resources on all other members of the replica group (except other resources designated as authoritative). In one implementation, this may be done by assigning each authoritative resource a special fence value. The resources of a content set (e.g., resources on a particular member) may be designated authoritative when, for example, a backup restore is performed on one member and it is desired that all other members also have this same content set.

The resources of a content set may be designated as non-authoritative when a member is recovered from a resource loss. When non-authoritative, the member's resources lose to resources from upstream partners. If for a particular resource the resource data is identical to that contained on an upstream partner, the resource data does not need to be downloaded from the upstream partner even if the resource metadata for the resource is different. The resources in a content set may be designated as non-authoritative, for example, when the resources of a member of a replica group have been lost or become corrupted, the resources have been restored from a backup, and it is desired that resources not replicate out from the member.

Sometimes a member's resource metadata will become corrupted or get lost or deleted. When this happens, the database storing the resource metadata may be deleted and rebuilt from the resource data. In this case, resources of the member's content set may also be designated as non-authoritative.

When a resource and its corresponding resource on an upstream partner are not designated as authoritative or non-authoritative, normal conflict resolution may be used to determine which resource wins and is replicated out.

Where it is desired to have a stale member become fresh, an interface may be exposed for a system administrator to force a stale replicated folder to be up-to-date. In one embodiment, the interface may update the timestamp to make the stale member fresh.

In systems in which the health of the system is monitored, a health model may consider a replicated folder in a stale state as a warning state and may show a warning in a report. As described above, a stale member may not need system administrator intervention so, in one embodiment, a stale state may be noted as a warning instead of a critical error.

Figure 4:
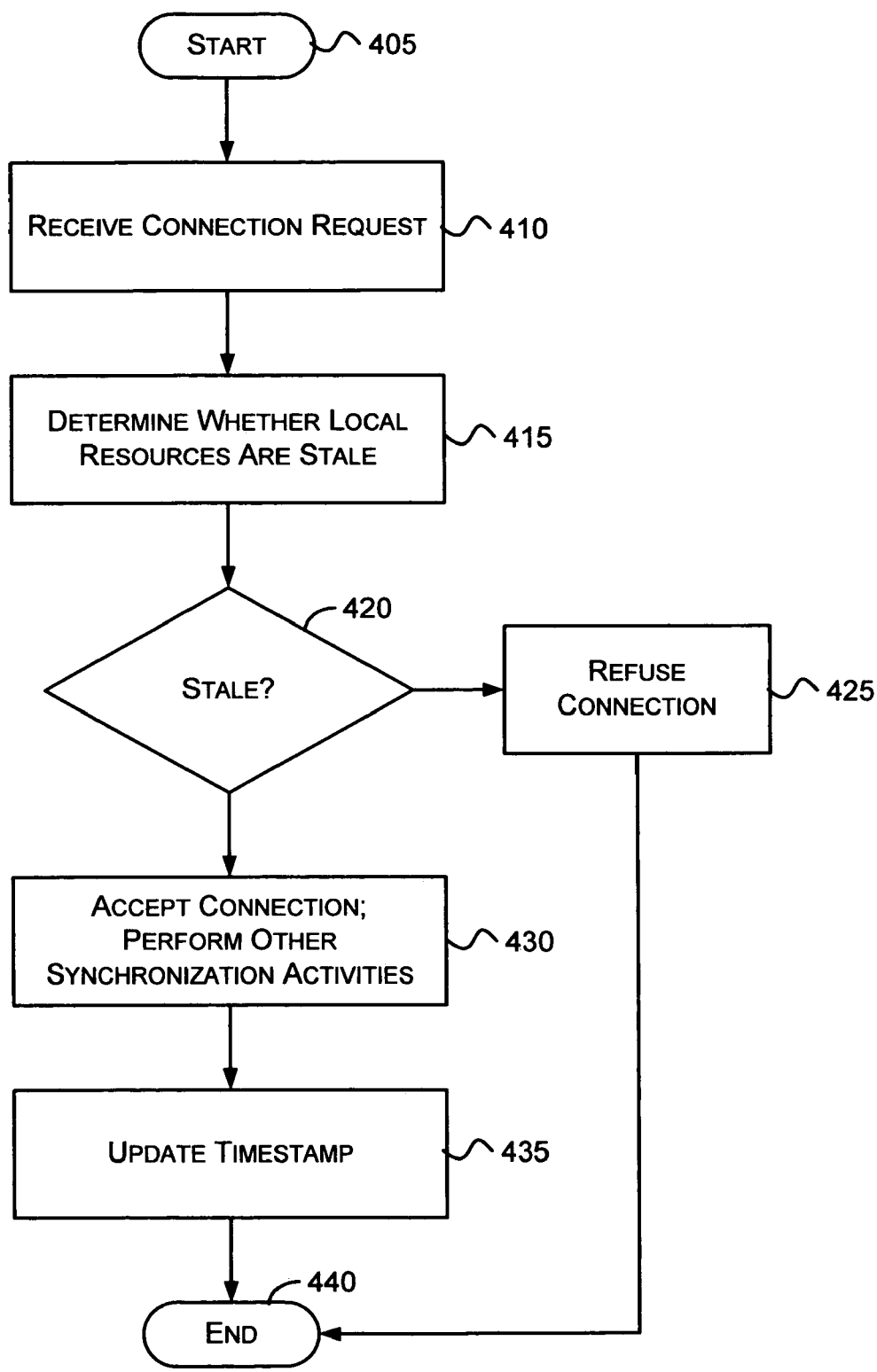
FIG. 4 is a flow diagram that generally represents actions that may occur in determining whether content on a local machine is fresh enough to synchronize with other members of a replica group in accordance with aspects of the subject matter described herein.

FIG. 4 is a flow diagram that generally represents actions that may occur in determining whether content on a local machine is fresh enough to synchronize with other members of a replica group in accordance with aspects of the subject matter described herein. At block 405, the actions begin.

At block 410, a connection request is received from a partner (either upstream or downstream). At block 415, the member that received the request determines whether its local resources are stale as described previously. At block 420, if the local resources are stale, the actions continue at block 425; otherwise, the actions continue at block 430. At block 425, the connection is refused and a message may be returned to the requester that indicates that the local resources are stale.

At block 430, the connection request is accepted and other synchronization activities may be performed (e.g., those activities described in conjunction with FIG. 3). At block 435, the timestamp may be updated to indicate that synchronization has recently occurred.

At block 440, the actions end.

Although not shown, before a member requests a connection with another member, the member may determine whether its local resources are stale. If so, the member may refrain from requesting the connection; otherwise, the member may request the connection, perform other synchronization activities, and update its timestamp.

Figure 5:
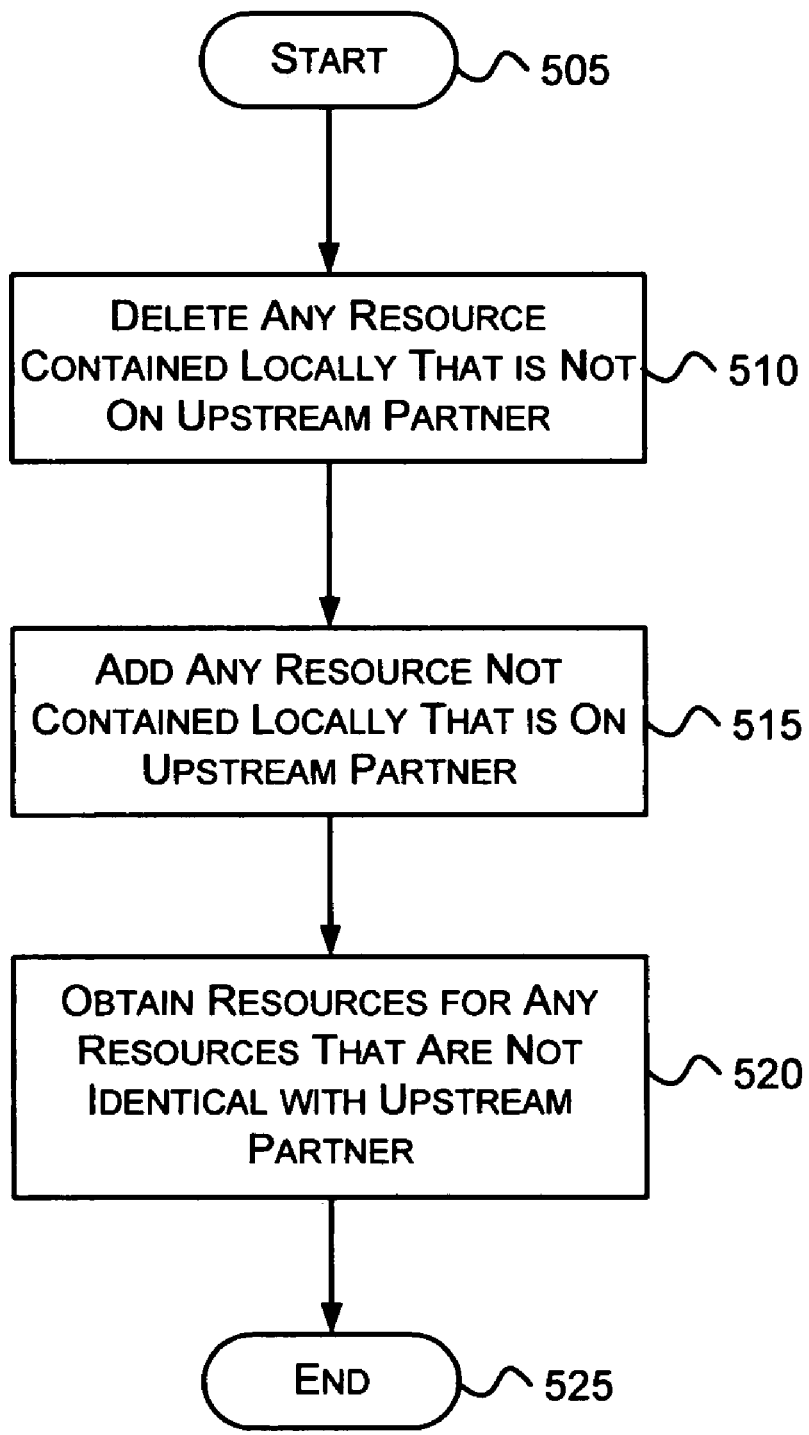
FIG. 5 is a flow diagram that generally represents actions that may occur when a member is determined to have stale content and is set as a slave to recover content in accordance with aspects of the subject matter described herein.

FIG. 5 is a flow diagram that generally represents actions that may occur when a member is determined to have stale content and is set as a slave to recover content in accordance with aspects of the subject matter described herein. At block 505, the actions begin in an initial synchronization phase.

At block 510, any resources that are contained locally on a member but that are not contained on an upstream partner with which the local partner is syncing with are deleted.

At block 515, any resources that are not contained locally that are contained on an upstream partner are added.

At block 520, any resources that are not identical with the upstream partner are obtained and local resources are updated accordingly.

At block 525, the actions end. After the actions end, the local partner may be considered to be past the initial synchronization stage and may thereafter synchronize resources as described in conjunction with FIG. 4.

Figure 6:
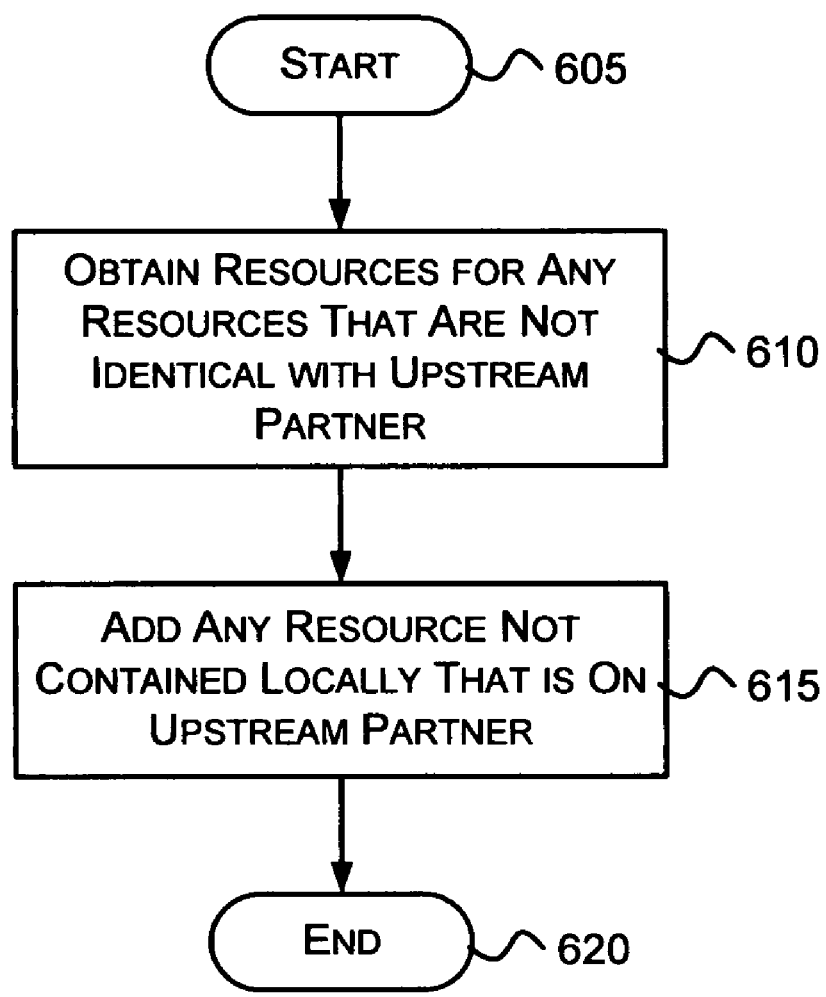
FIG. 6 is a flow diagram that generally represents actions that may occur when a member is determined to have stale content and is set to merge content with an upstream partner in accordance with aspects of the subject matter described herein.

FIG. 6 is a flow diagram that generally represents actions that may occur when a member is determined to have stale content and is set to merge content with an upstream partner in accordance with aspects of the subject matter described herein. At block 605, the actions begin in an initial synchronization phase.

At block 610, any resources that are not identical with the upstream partner are obtained and local resources are updated accordingly.

At block 615, any resources that are not contained locally that are contained on an upstream partner are added.

At block 620, the actions end. After the actions end, the local partner may be considered to be past the initial synchronization stage and may thereafter synchronize resources as described in conjunction with FIG. 4. This may include synchronizing resources out that were deleted on other members for which the tombstone was also deleted as described previously.

It should be understood that the actions described in conjunction with FIGS. 4-6 are not all-inclusive of all the actions that may be taken in may take in checking for resource freshness in replication systems. Furthermore, although the actions are described as occurring in a particular order, in other embodiments, some of the actions may occur in parallel or may be performed in another order without departing from the spirit or scope of the subject matter described herein.

As can be seen from the foregoing detailed description, aspects have been described related to content freshness and resource replication systems. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-storage medium having computer executable instructions, comprising:
    detecting whether local resources stored within a first folder and hosted on a local machine are stale via a first timestamp associated with the first folder, the local machine also storing local resources within a second folder having an associated second timestamp different from the first timestamp, wherein the first timestamp includes a time of a previous synchronization of the local resources within the first folder, wherein the previous synchronization comprised applying updates to the local resources within the first folder received from an upstream partner, wherein the local machine and the upstream partner participate in a replica group, and wherein the first timestamp is updated only upon synchronization of the local resources within the first folder, the synchronization of the local resources occurring at an update frequency;
    wherein the detecting further comprises:
        determining a difference between the first timestamp and a local system clock; and
        comparing the difference to a staleness value to determine whether the difference exceeds the staleness value, wherein the staleness value is greater than the update frequency and less than or equal to a tombstone period that indicates how long a resource is marked as deleted before resource metadata associated with the resource is deleted;
    when the local resources are stale, refraining from sending updates of the local resources from the local machine to a downstream partner; and
    when the local resources are not stale, sending updates of the local resources from the local resources to the downstream partner.

2. The computer-storage medium of claim 1, wherein detecting whether local resources are stale via a timestamp comprises determining a difference between the timestamp and a time of local system clock of the local machine.

3. The computer-storage medium of claim 1, wherein the staleness value is selectable by a system administrator.

4. The computer-storage medium of claim 1, wherein the synchronization further comprises:
    obtaining any resource on the upstream machine that is not identical to a corresponding resource on the local machine;
    adding any resource that is contained on the upstream machine that is not contained on the local machine; and
    marking the local resources as fresh by updating the timestamp.

5. The computer-storage medium of claim 4, wherein the synchronization further comprises deleting any resource on the local machine that is not on the upstream partner.

6. The computer-storage medium of claim 1, wherein a successful synchronization comprises maintaining a connection with the upstream machine.

7. A method implemented at least in part by a computer, the computer including at least one processor and memory and the method comprising:
    storing at a second member a first value in association with a first replicated folder and storing at the second member a second value different from the first value in association with a second replicated folder, the first value including a previous time of a first synchronization of the first replicated folder between the second member and other members that replicate resources with the second member, wherein the-synchronization comprises applying updates made to a resource stored in a first member's first replicated folder to a corresponding replicated resource stored in the second member's first replicated folder, and wherein the first value is updated only upon synchronization between the second member's first replicated folder and the other members that replicate resources with the second member, the synchronization between the second member's first replicated folder and the other members occurring at an update frequency;
    receiving a request from a third member to engage in a second synchronization, wherein the request is received at the second member and the request comprises both a connection request and a request to transmit updates for the replicated resource stored in the second member's first replicated folder to the third member;
    determining, by the second member, that the replicated resource stored on the second member's first replicated folder is not up-to-date by computing the difference between a current time and the previous time of the first synchronization and determining that the difference exceeds a staleness value, wherein the staleness value is greater than the update frequency and less than or equal to a tombstone period that indicates how long a resource is marked as deleted before resource metadata associated with the resource is deleted; and
    in response to the determining step, accepting, by the second member, the connection request from the third member and refusing the request to transmit updates for the replicated resource to the third member.

8. The method of claim 7, wherein the value comprises a timestamp.

9. The method of claim 7, wherein the first synchronization further comprises a successful synchronization of a plurality of resources between the first member and the second member.

10. The method of claim 7, wherein the first member and the third member are the same.

11. In a computing environment, an apparatus, comprising:
    a processor for executing computer executable instructions; and
    computer storage media storing computer executable instructions that when executed provide:
        a resource store arranged to store resource metadata for resources that are replicated by members arranged to participate in a replica group, wherein the resource store is also arranged to store for each folder in the resource store a different value including a time at which a successful synchronization occurred, wherein the successful synchronization comprised applying updates to a resource stored in one of the folders of the resource store, and wherein the value is updated only upon synchronization of the one of the folders with a folder stored on a member of the replica group, the synchronization of the one of the folders occurring at an update frequency; and an update mechanism arranged to determine whether resources stored in the one of the folders of the resource store are fresh enough to engage in a second synchronization, wherein the second synchronization comprises sending updates for a second resource stored in the one of the folders of the resource store, the update mechanism;

determining a difference between the value and a local system clock; and comparing the difference to a staleness value to determine whether the difference exceeds the staleness value, wherein the staleness value is greater than the update frequency and less than or equal to a tombstone period that indicates how long a resource is marked as deleted before resource metadata associated with the resource is deleted.

12. The apparatus of claim 11, wherein the update mechanism comprises epoch logic that indicates conditions for which resources of the resource store are fresh enough to engage in the second synchronization.

13. The apparatus of claim 12, wherein the resources are fresh enough when the time at which the successful synchronization occurred is within a staleness value of a time at which the second synchronization is requested.

14. The apparatus of claim 12, wherein the resource and the second resource are the same.

* * * * *